(12) United States Patent
Mazzochi

(10) Patent No.: US 7,336,504 B2
(45) Date of Patent: Feb. 26, 2008

(54) COMPUTER COMPONENT COVER

(76) Inventor: Paul Raymond Mazzochi, 58 Laurel St., Vineland, NJ (US) 08360

( * ) Notice: Subject to any disclaimer, the term of this patent is extended or adjusted under 35 U.S.C. 154(b) by 178 days.

(21) Appl. No.: 11/198,047

(22) Filed: Aug. 5, 2005

(65) Prior Publication Data
US 2007/0029224 A1 Feb. 8, 2007

(51) Int. Cl.
*H05K 5/03* (2006.01)

(52) U.S. Cl. ............... 361/809; 361/683; 361/724; 361/752; 292/148; 341/23

(58) Field of Classification Search ........... 361/752, 361/683, 807, 724, 809, 681; 248/551–553; 292/148; 312/216
See application file for complete search history.

(56) References Cited

U.S. PATENT DOCUMENTS

| D424,540 S | * | 5/2000 | Roth ............... D14/448 |
| D442,600 S | * | 5/2001 | Cecilia et al. ........ D14/440 |
| 6,285,299 B1 | * | 9/2001 | King-DeBaun ........ 341/23 |
| 6,301,102 B1 | * | 10/2001 | Ybarra ............. 361/683 |
| 6,402,269 B1 | * | 6/2002 | Roth ............... 312/7.2 |
| D462,518 S | * | 9/2002 | Truffier-Blanc et al. .... D3/273 |
| 6,520,607 B2 | * | 2/2003 | Pfaff .............. 312/204 |

* cited by examiner

*Primary Examiner*—Tuan T. Dinh
*Assistant Examiner*—Dameon E. Levi
(74) *Attorney, Agent, or Firm*—Michael B. Fein; Cozen O'Connor

(57) ABSTRACT

The present invention relates a cover which changes the aesthetic appearance of a computer component by providing an area to display an image, graphic, logo or text. Attachment shall be of a simple, easily attachable/detachable type requiring little or no modification to the computer component.

4 Claims, 2 Drawing Sheets

COMPUTER COMPONENT COVER

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The present invention relates generally to the field of computer component accessories and more specifically to a computer component cover that changes the aesthetic appearance of a computer component by providing and area to display an image, graphic, logo or text.

Computers, especially smaller computers known as Personal Computers, or "PC's" have become commonplace in many homes and most businesses. These computers include components that contain unsightly buttons, drives and lights. The embodiment of the present invention is a cover for changing the aesthetic appearance of a computer component by providing an area to display an image, graphic, logo or text. This image, graphic, logo or text may include, but is not limited to, the display of sporting team emblems; school letters and/or seals; corporate logos; trademarks; advertisements; images of people; images of fictional, comic or cartoon characters; and/or other images, graphics, letters, words or phrases.

Enclosures for computers and components, such U.S. Pat. No. 5,163,870 to Cooper which discloses a dust cover for computer components, and U.S. Pat. No. 4,932,524 to Hodson which discloses a cover with a removable flap to protect from dust and spills are not new. They are designed to prevent pollutants from entering a computer component. Other inventions, such as U.S. patent application Ser. No. 6,402,269 to Roth, are designed to provide a decorative cover that protects from hazardous elements. Even further inventions, such as U.S. Patent Application No. 20030178114 to Enlow and Gabbard, are designed to shield a computer component in order to limit access to the knobs, buttons and slots. These prior art inventions are designed to protect computer components from external pollutants and hazardous elements, or from physical shock which may cause the external buttons, knobs and slots to be inadvertently adjusted or damaged.

Yet another class of inventions, such as U.S. Pat. No. 5,564,209 to Zagnoli and U.S. Pat. No. 5,759,644 to Stanley, provide ornamental devices designed to attach around the sides of a cathode ray tube (CRT) or computer monitor. These prior arts are devised specifically for a CRT and/or computer monitor and display an ornamental fabric, device or frame by attaching around the sides of the CRT or monitor and do not need to be removed in order to use the device. These prior arts do not designate a computer component cover specifically designed to provide an area to display an image, graphic, logo or text.

Although the prior art inventions may be effective for the purposes disclosed in the patents discussed above, they do not address the issue of aesthetics by disclosing a cover designed to provide an area to display an image, graphic, logo or text.

The present embodiment of the invention differs from the prior arts in that it is a cover to change the aesthetic appearance of a computer component by providing an area to display an image, graphic, logo or text. In addition, the present invention is easily and quickly removable to allow access to the computer component.

BRIEF SUMMARY OF THE INVENTION

The primary object of the invention is to change the aesthetic appearance of a computer component by providing an area to display an image, graphic, logo or text, which may include, but is not limited to, the display of sporting team emblems; school letters and/or seals; corporate logos; trademarks; advertisements; images of people; images of fictional, comic or cartoon characters; and/or other images, graphics, letters, words or phrases.

A further object of the present invention is to provide quick and easy attachment and detachment requiring little or no modification to the computer component.

Other objects and advantages of the present invention will become apparent from the following descriptions, taken in connection with the accompanying drawings, wherein, by way of illustration and example, an embodiment of the present invention is disclosed.

In accordance with a preferred embodiment of the present invention there is disclosed a cover for changing the aesthetic appearance of a computer component by providing an area to display an image, graphic, logo or text, and which is easily attached and detached from the computer component, requiring little or no modification to the computer component comprising: a cover, an area to display an image, graphic, logo or text and a simple means of attachment and detachment to the computer component, requiring little or no modification, to said computer component.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated, enlarged or reduced to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
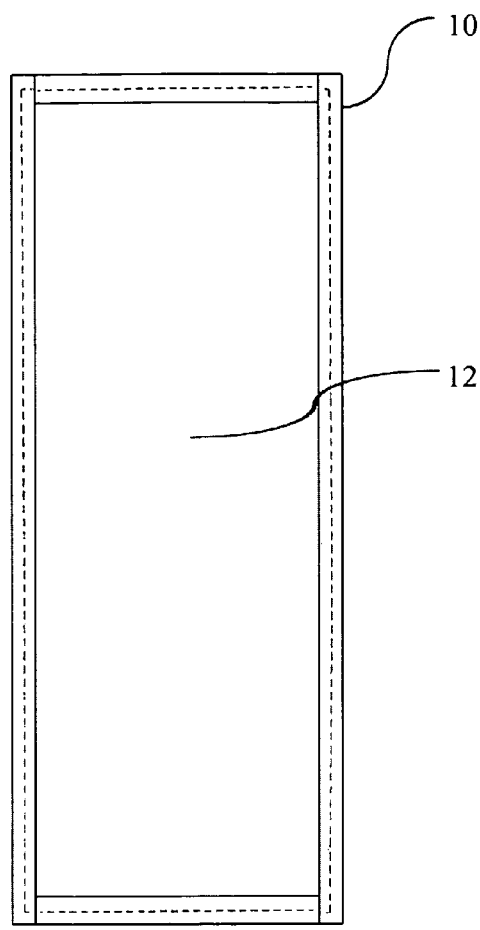
FIG. 1 is a view of one embodiment of the present invention depicting a computer component cover and area to display an image, graphic, logo or text on said cover.

FIG. 1 is a representation of one embodiment of the present invention depicting a computer CPU cover 10 according to the invention, including an area 12 to display an image, graphic, logo or text on said cover 10. Specifically, FIG. 1 shows the outward face of a computer CPU cover 10 comprised of a flexible fabric member, and an area 12 to display an image, graphic, logo or text on said cover 10. The cover 10 can be constructed of fabrics, textiles, plastics and/or other materials. It should be understood that the cover 10 embodiment shown in FIG. 1 is for the purposes of illustration only. Thus, the configuration and composition of the cover may be varied, depending upon CPU configuration and materials available for construction, without departing from the present invention.

Figure 2:
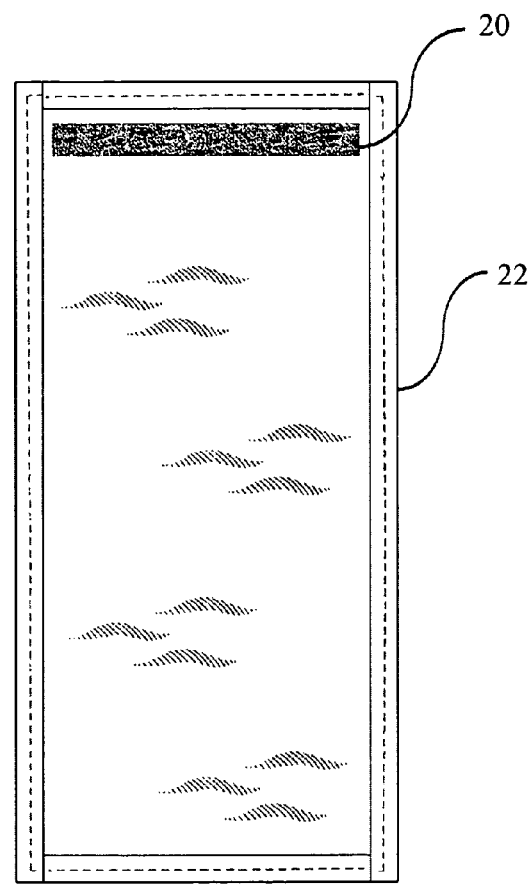
FIG. 2 is a representation of the back view of the cover depicting hook and loop attachment fasteners secured to the back of the cover providing a means of allowing attachment/detachment requiring little or no modification to the computer component.
Figure 3:
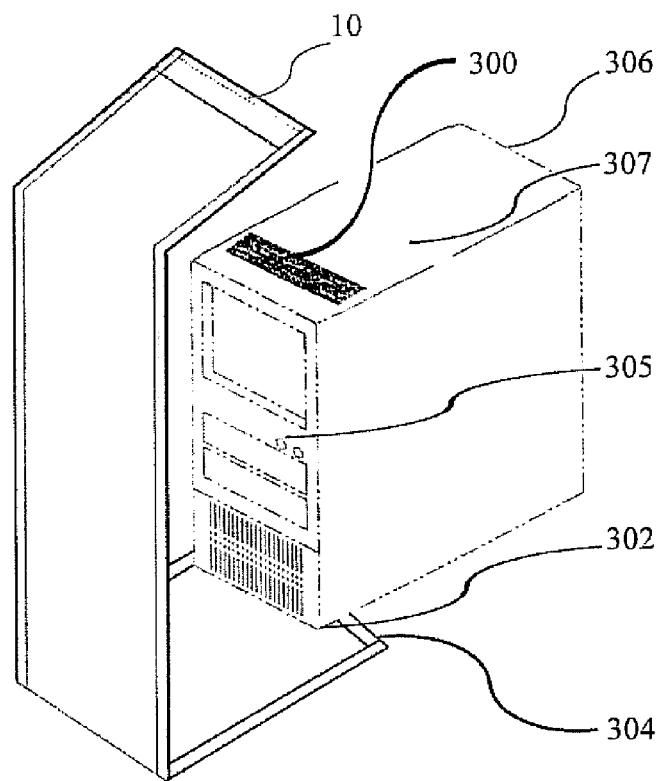
FIG. 3 is a representation depicting a means of attaching/detaching the cover requiring little or no modification to the computer component.

FIG. 2 is a representation of one embodiment of the back view 22 of the cover 10, depicting a means of allowing attachment/detachment requiring little or no modification to the CPU 306 (FIG. 3). Specifically, FIG. 2 shows one half of a strip of hook and loop fasteners 20 attached to one end of the back side of the cover 22, providing a means of securing the cover 22 to the top 307 (FIG. 3) of the CPU 306 (FIG. 3).

FIG. 3 is a representation depicting a means of securing the cover 10 to a CPU 306. Specifically, it depicts one end 304 of the cover 10 fixed firmly under the front bottom 302 of the CPU 306 with the front bottom 302 of the CPU 306 resting on top of the end 304 of the cover 10 to securely hold the end 304 of the cover 10. FIG. 3 also depicts one half of a strip of hook and loop fasteners 300 attached to the top 307 of the CPU 306 about to be mated with the other half 20 (FIG. 2) of hook and loop fastener strip on the bottom 22 (FIG. 2) of cover 10. By combining the one half of the hook and loop fasteners 20 (FIG. 2) located on the back side 22 of the cover 10 with the other half of hook and loop fasteners 300 attached to the top 307 of the CPU 306, the cover 10 of the present invention is easily attached and detached to allow access to the front 305 of the CPU 306. Another embodiment of the present invention may allow for one end of the cover 10 to hang loosely at the bottom of the CPU 306. Yet another variation may allow the cover to attach to the CPU 306 at multiple points.

Figure 4:
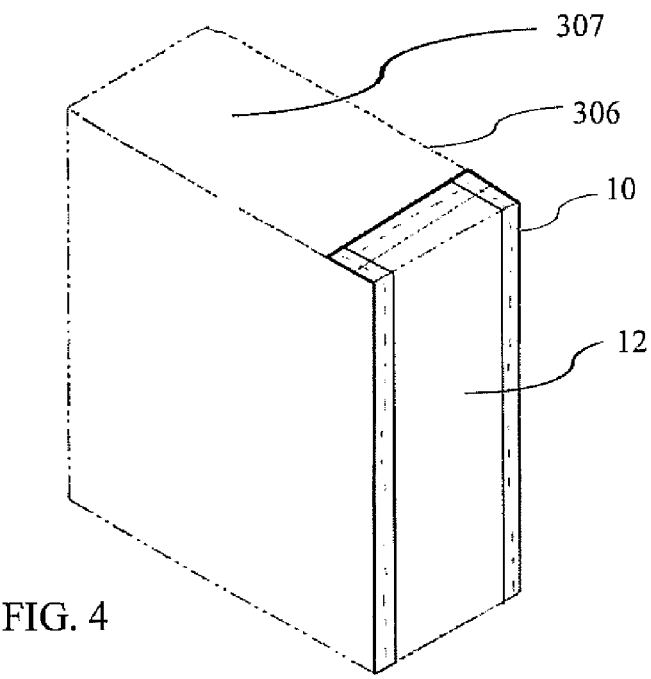
FIG. 4 is a representation of the preferred embodiment of the present invention shown attached to a typical computer component, depicting a cover and area to display an image, graphic, logo or text on said cover.

FIG. 4 is a representation of the preferred embodiment of the cover 10 of the present invention shown attached to the top 307 of a typical CPU 306, depicting a cover 10 and area 12 to display an image, graphic, logo or text on said cover.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A cover to change the aesthetic appearance of a computer CPU having a front by providing an area to display an image, graphic, logo or text; comprising:
   a.) a cover comprising an outward face and a back side and comprising a section adapted to completely cover the front of the CPU;
   b.) an area on the outward face to display an image, graphic, logo or text on said cover; the cover having a width approximately the width of a CPU in a vertical orientation and a length, comprised of a first section, a second section, and an optional third section, the sections separated by folds, the first section having one half of a strip of hoop or loop fastener material on the back side, the first section of a relatively short length, the second section having a length approximately the height of the CPU, the optional third section, when present, having a relatively short length, the cover designed to be secured to a CPU which has a top, a front, a front top corner, and a bottom, and has the second half of a strip of hoop and loop fastener material on the top, by arranging the first section of the cover on top of the CPU so that the two halves of the hook and loop fastener are mated with each other and the fold between the first and second sections is above the front top corner of the CPU so that the cover is supported on top and in front of the CPU and the front of the CPU is completely covered.

2. The cover of claim 1, wherein the second section is approximately the height of the CPU in a vertical orientation and the cover is designed to be secured to a vertically oriented CPU.

3. The. cover of claim 1, composed of a fabric, textile, and/or plastic.

4. The cover of claim 1, wherein the third section is present and is designed to be placed below the CPU to securely hold the bottom of the cover.

* * * * *